US009549104B1

(12) United States Patent
Basso et al.

(10) Patent No.: US 9,549,104 B1
(45) Date of Patent: Jan. 17, 2017

(54) BORESCOPE HAVING A CAMERA CONCEALABLE WITHIN A HAND-HELD CASE

(71) Applicants: Kevin Basso, Islip Terrace, NY (US); Jerome O. Ennis, Hampton, NJ (US)

(72) Inventors: Kevin Basso, Islip Terrace, NY (US); Jerome O. Ennis, Hampton, NJ (US)

(73) Assignee: General Tools & Instruments Company, LLC, Secaucus, NJ (US)

( * ) Notice: Subject to any disclaimer, the term of this patent is extended or adjusted under 35 U.S.C. 154(b) by 268 days.

(21) Appl. No.: 14/309,721

(22) Filed: Jun. 19, 2014

(51) Int. Cl.
*H04N 5/225* (2006.01)
*H04N 5/232* (2006.01)

(52) U.S. Cl.
CPC .......... *H04N 5/2252* (2013.01); *H04N 5/2253* (2013.01); *H04N 5/23293* (2013.01); *H04N 2005/2255* (2013.01)

(58) Field of Classification Search
CPC .............. G01N 21/718; G01N 27/9033; A61B 1/00114; A61B 1/00124; A61B 1/00126; A61B 1/00165; A61B 1/0058; A61B 1/051; A61B 1/06; A61B 5/0062; A61B 5/0066; A61B 5/0084; A61B 5/065; A61B 5/411; G02B 6/3807; G02B 6/3833; G02B 6/385; G02B 6/3866; G02B 6/4204; G02B 6/444; G02B 6/4457

USPC ........ 356/237.3, 318; 348/75; 382/312, 321; 600/110, 132
See application file for complete search history.

(56) References Cited

U.S. PATENT DOCUMENTS

| 7,356,236 | B1 * | 4/2008 | Huang | G02B 6/3807 385/134 |
| 2004/0160514 | A1 * | 8/2004 | Tawfig | E21B 47/0002 348/85 |
| 2009/0009945 | A1 * | 1/2009 | Johnson | G06F 1/1613 361/679.27 |
| 2013/0278747 | A1 * | 10/2013 | Yang | G02B 23/2476 348/82 |
| 2015/0057952 | A1 * | 2/2015 | Coombs | G01N 35/00584 702/38 |

\* cited by examiner

*Primary Examiner* — Behrooz Senfi
(74) *Attorney, Agent, or Firm* — Edwin D. Schindler

(57) ABSTRACT

A borescope having a miniature camera concealable within a hand-held casing, includes a casing, which is preferably a clam shell casing and is able to be held in a single hand of a user, along with a device for opening the casing. A flexible probe has a first end mounted in the casing and a second end being a distal end that is able to be moved from inside the casing to outside the casing with the miniature camera being located at, or proximate to, the distal end of the flexible probe for viewing structures outside of the casing after the casing is opened. The flexible probe with the miniature camera is able to be completely concealed within the casing when not in use. A display is located on a surface of the casing for viewing by the user that which is being seen by the miniature camera.

7 Claims, 8 Drawing Sheets

BORESCOPE HAVING A CAMERA CONCEALABLE WITHIN A HAND-HELD CASE

BACKGROUND OF THE INVENTION

Technical Field of the Invention

The present invention relates, generally, to a borescope that is capable of being held within the palm of one hand of a user.

More particularly, the present invention relates to a borescope having a casing, preferably a clam shell casing, that is capable of retaining and concealing within the casing, when not in use, a flexible tube or probe having a camera at one end for the inspection of structures not readily able to be directly inspected by a person's eyesight. The borescope of the present invention is able to be retained by a user in a single hand, preferably the user's palm, and readily activated for eventual use.

Description of the Prior Art

Borescopes are used in the mechanical arts generally, and particularly within the building trades, for permitting the inspection of narrow or relatively inaccessible spaces or cavities, in which the borescope has an optical device at the distal end of either a rigid or flexible probe for allowing the viewing of areas that are otherwise inaccessible without great inconvenience. With the borescopes known to the prior art, care must be taken to protect from damage the optical device, or miniature camera, located at the distal end of the probe when the borescope is not in use. Following use of conventional borescopes, the probe must be retracted and somehow stored in a manner which does not expose the optical device at the distal end of the probe to an unreasonable opportunity for damage.

Absent from the prior art is a borescope that can readily be held within a single hand of a user and which includes a flexible probe that is able to be safely and readily stored within the hand-held casing for the borescope when not in use, so as to protect from damage the optical means located at the distal end of the flexible probe.

SUMMARY OF THE INVENTION

It is therefore an object of the present invention to provide a borescope having a camera that is concealable within a hand-held casing for protecting the camera or other optical means from damage when not in use.

It is a further object of the present invention to provide a borescope having a camera that is concealable within a hand-held casing that has a flexible probe with the camera at the distal end of the probe and wherein the probe can be readily extended or contracted and returned to the casing with ease.

The foregoing and related objects are achieved by the boroscope of the present invention, which includes a casing capable of being held within one hand, preferably the palm, of a user and in which a flexible probe is located that has optical means, such as a miniature camera, located at the distal end of the flexible probe for permitting the inspection of small or substantially concealed, otherwise difficult to view, structures. When not in use, the flexible probe with its camera is able to be completely retained within the casing of the borescope device, thereby providing full protection of the miniature camera. Preferably, the casing for the borescope of the present invention is a clam shell casing and which preferably includes latch or other locking means that can readily be opened by the touch of a user. The casing with the borescope preferably includes spring, or other biasing means, that bias the casing toward open, when activated by the touch of a user, for releasing from within the casing the flexible probe with its optical means for inspection.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the present invention.

BRIEF DESCRIPTION OF THE DRAWING FIGURES

In the drawing, wherein similar reference numerals and symbols denote similar features throughout the several views.

Figures 6A, 6B:
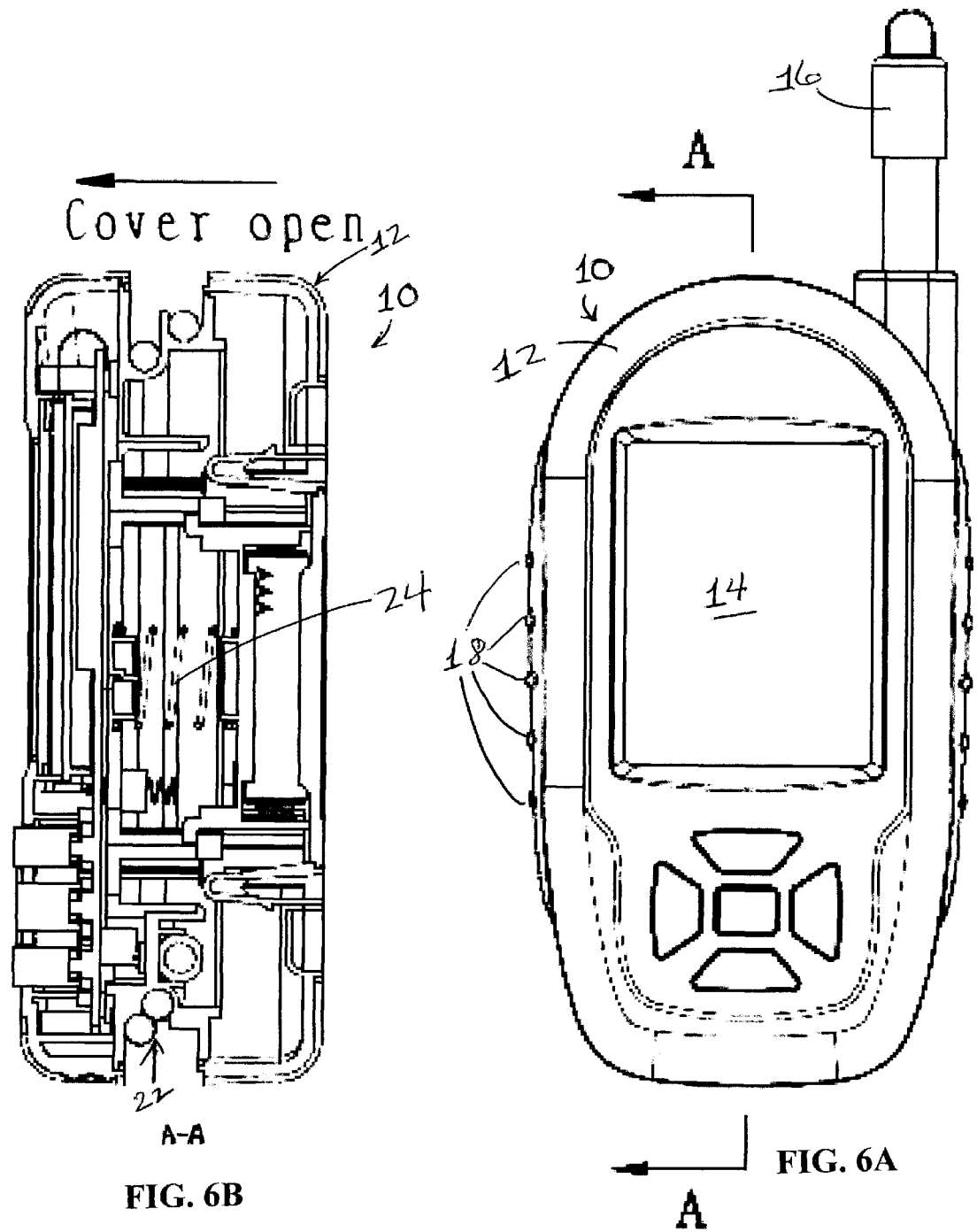
Figure 7:
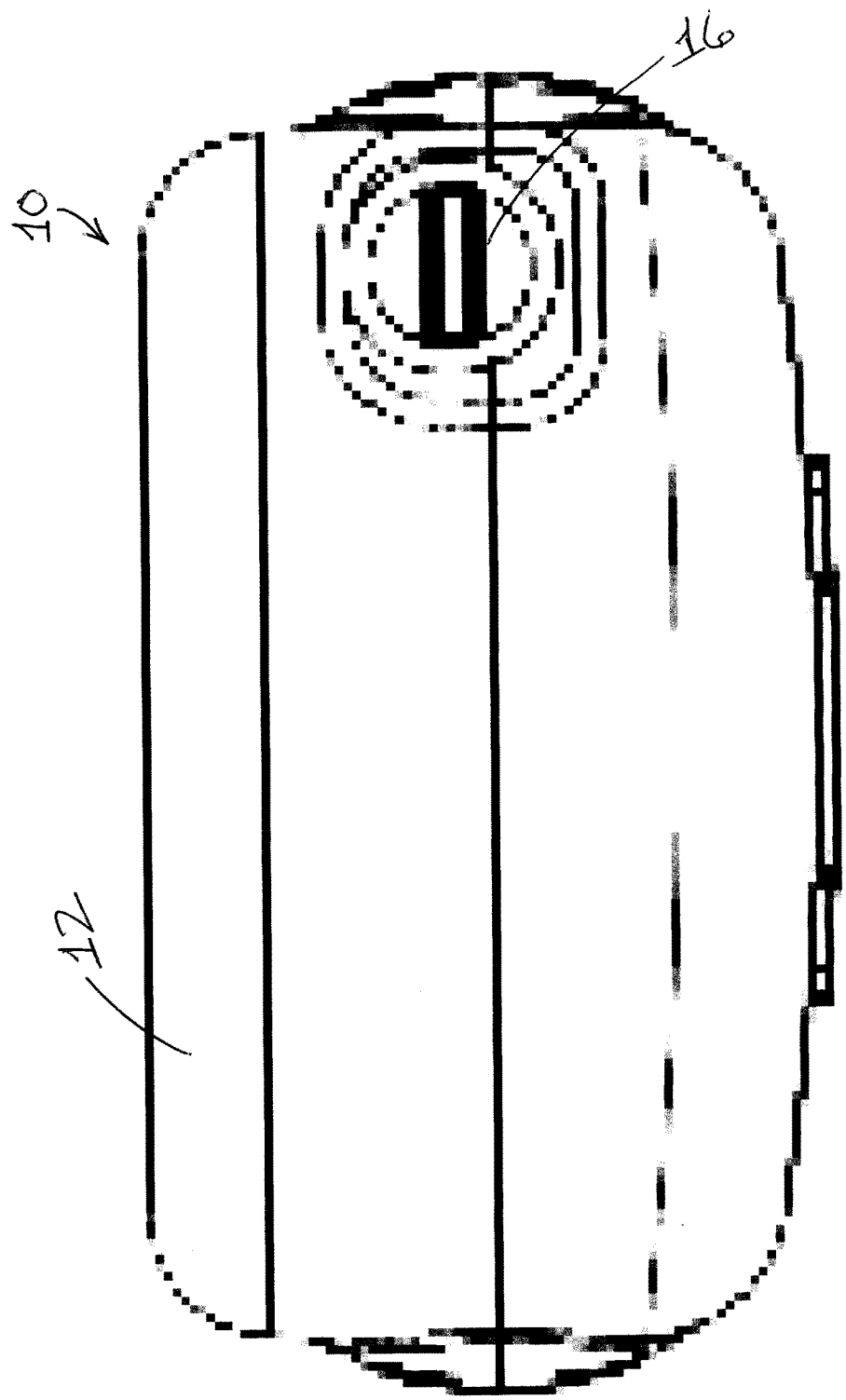
Figure 8:
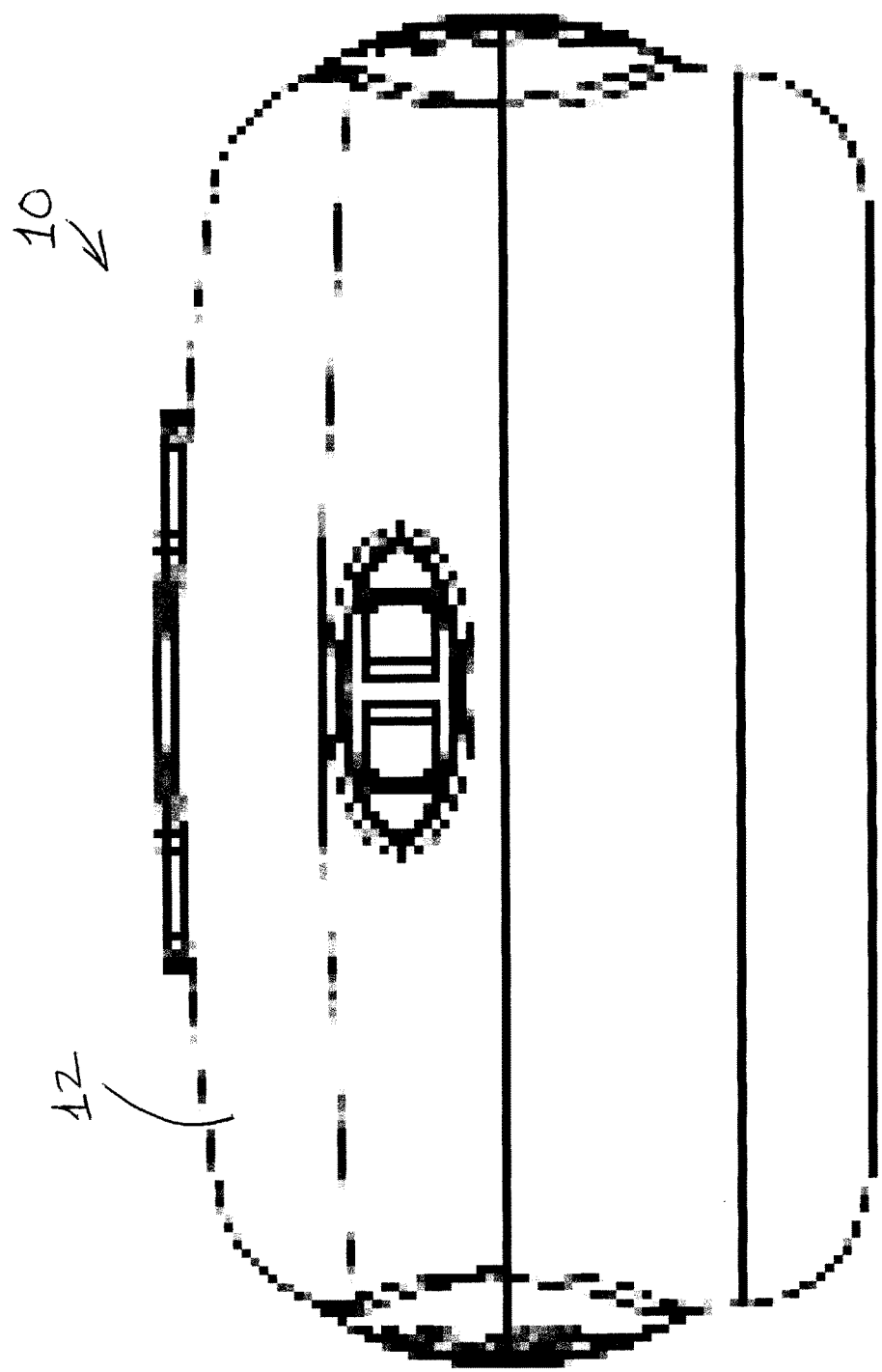

FIG. 6B provides a sectional view of the locking mechanism of the clam shell casing of the borescope apparatus of the present invention with FIG. 6A showing a front elevational view of the borescope apparatus with line A-A and with FIG. 6B being a view taken along with line A-A of FIG. 6A;

FIG. 7 is a top plan view of the hand-held borescope apparatus of the present invention; and, FIG. 8 is a bottom plan view of the hand-held borescope apparatus of the present invention.

DETAILED DESCRIPTION OF THE PREFERRED EMBODIMENTS AND DRAWING FIGURES

Figure 1:
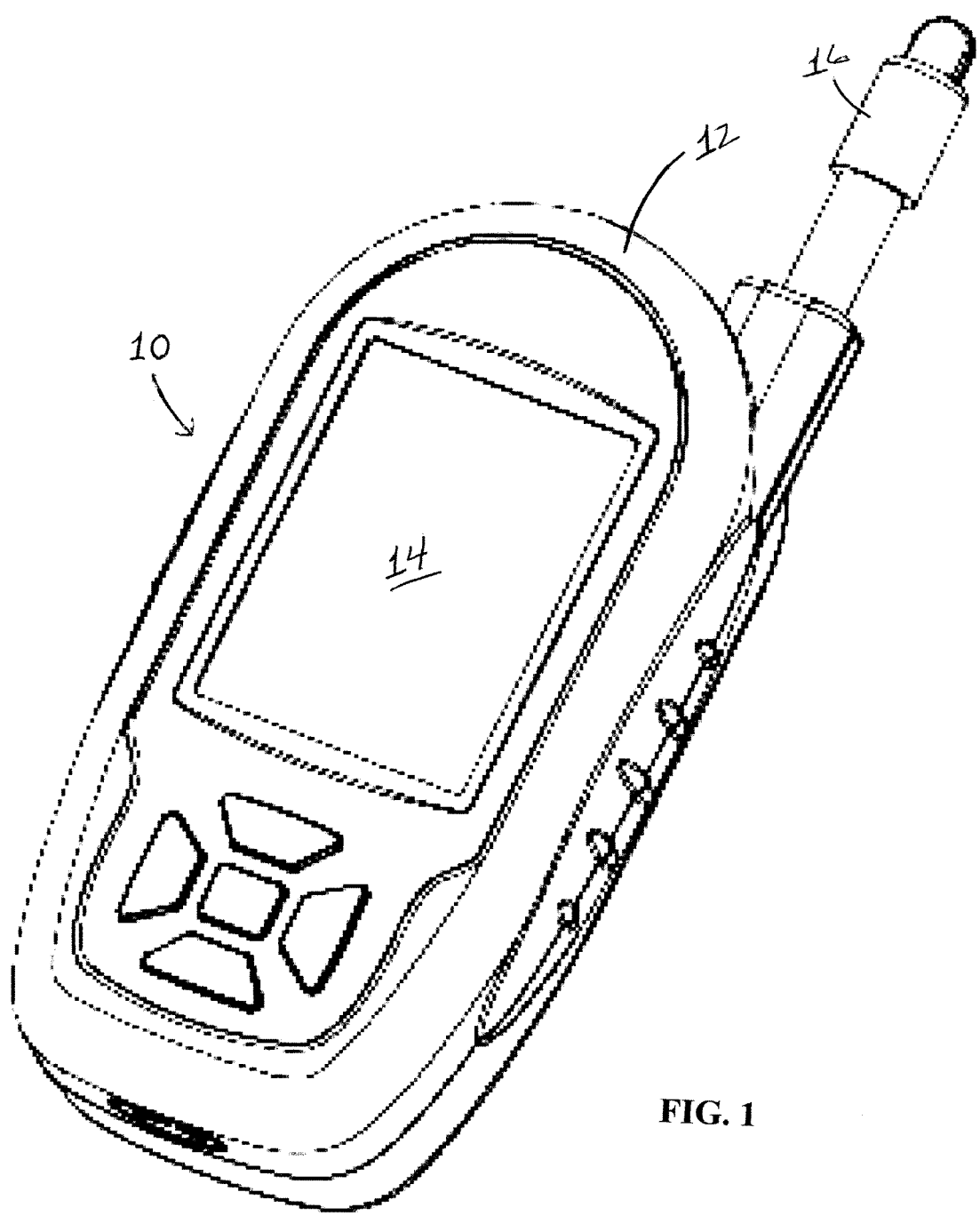
FIG. 1 is a top right prospective view of the hand-held borescope apparatus of the present invention.
Figure 2:
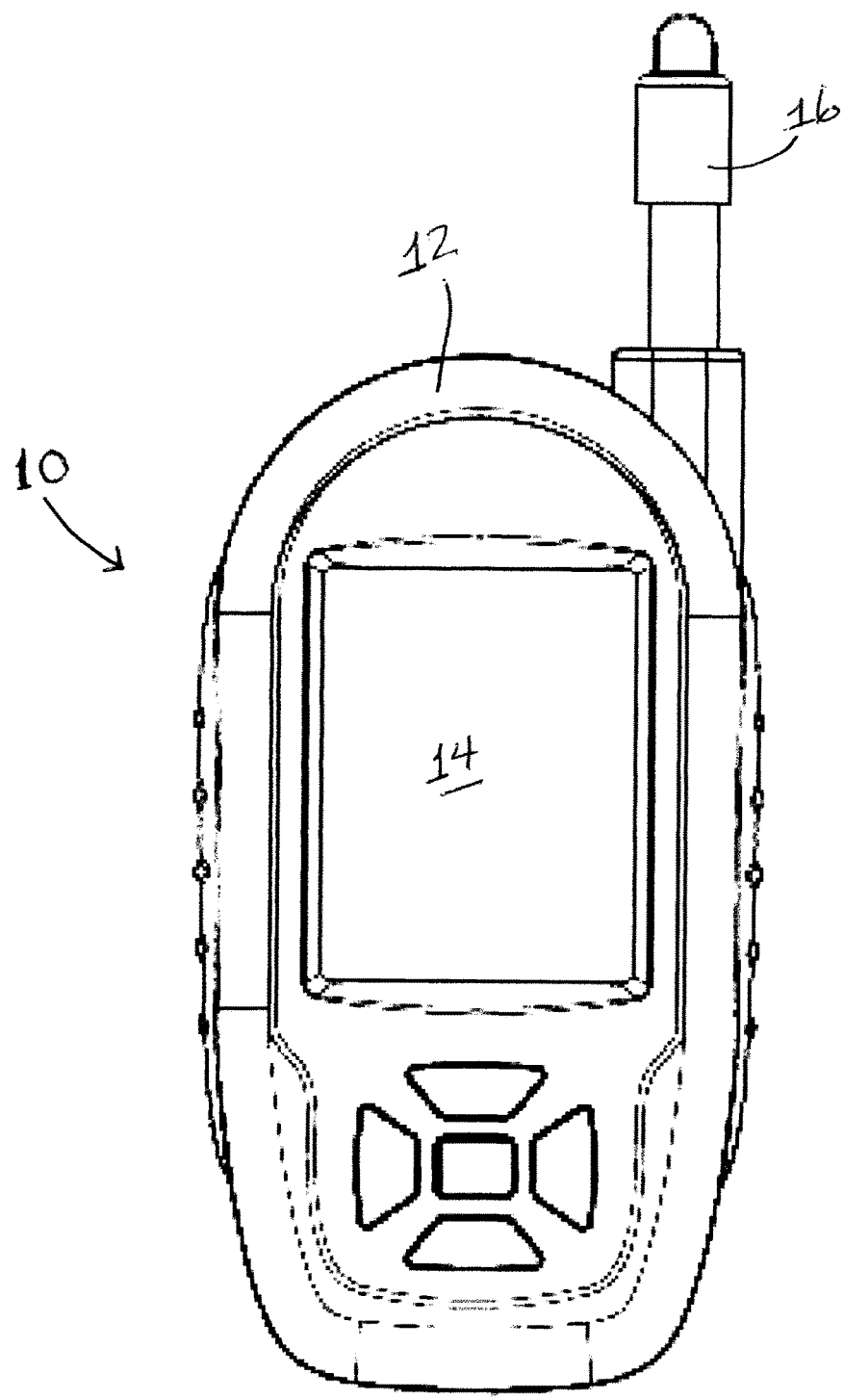
FIG. 2 is a front elevational view of the hand-held borescope apparatus of the present invention.

Turning now, in detail, to an analysis of the accompanying drawing figures, FIG. 1 provides a top right prospective view, while FIG. 2 shows a front elevational view, of the hand-held borescope 10 of the present invention, which preferably includes a clam shell casing 12, with a display 14 having video capabilities, preferably an LCD display, which allows for the flexible probe 16 (shown as partially extended) having a camera at its distal end to be easily concealed within the casing.

Figure 3:
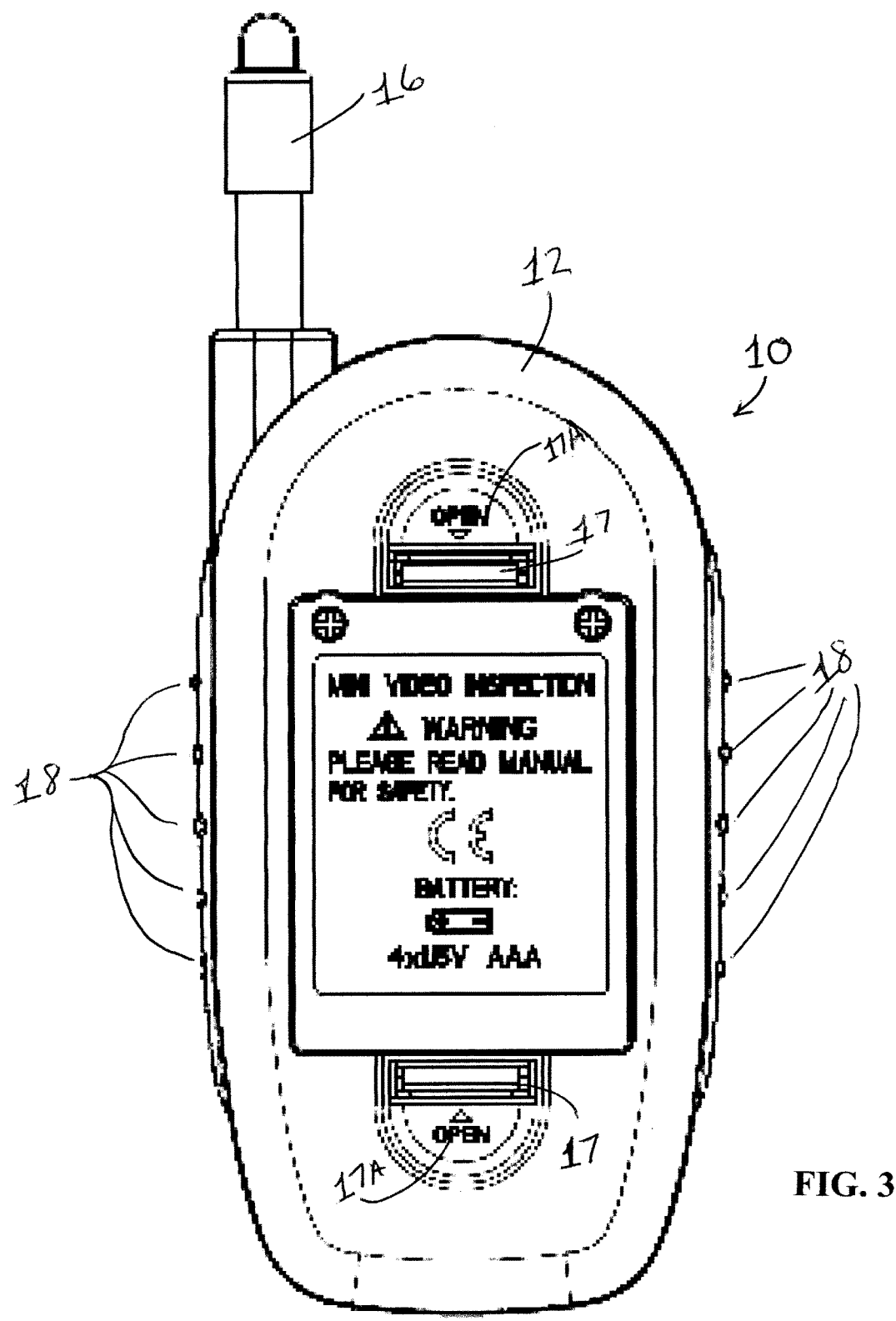
FIG. 3 is a rear elevational view of the hand-held borescope apparatus of the present invention.
Figure 4:
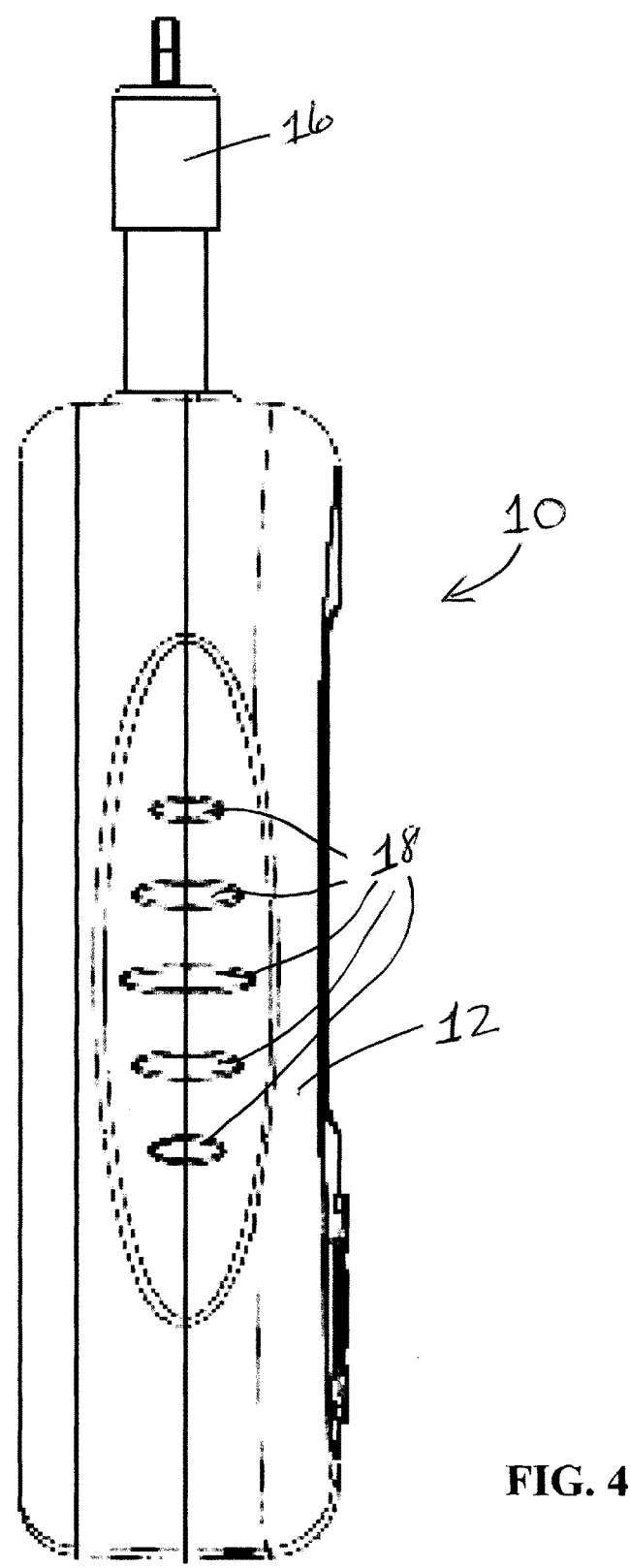
FIG. 4 is a left elevational view of the hand-held borescope apparatus of the present invention.
Figure 5:
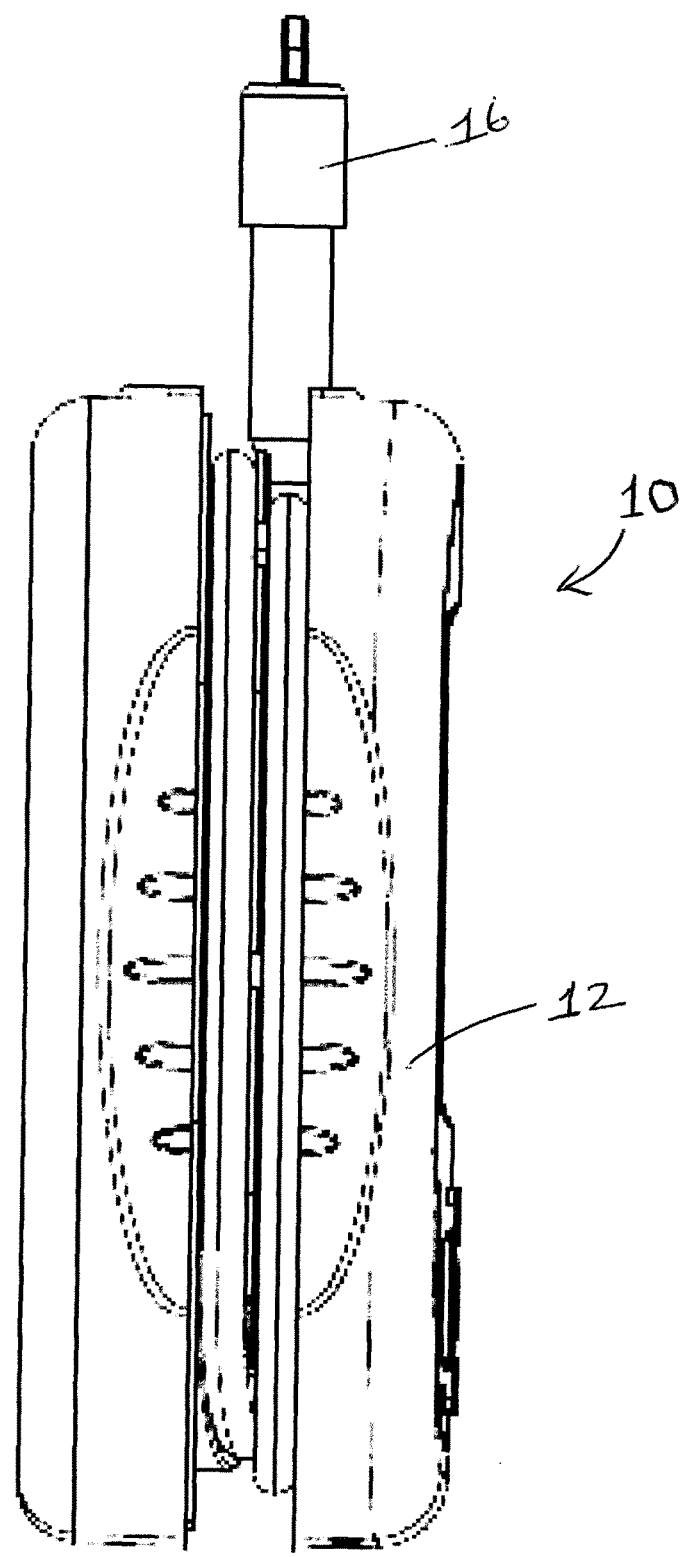
FIG. 5 is a left elevational view of the hand-held borescope apparatus of the present invention with its clam shell casing being in an open position.

Preferably, clam shell casing 12 includes a locking mechanism 17 located at the back of the hand-held borescope 10, as shown in FIG. 3, which can readily be triggered by the application of pressure upon the opening trigger 17A when held by a user via hand grips 18 located on each side of hand-held borescope 10. FIG. 4 is a left side elevational view in which hand grips 18 are readily visible on the left side of the borescope. Pressing the two sets of hand grips 18 (located on each side of the borescope) is intended to release the locking mechanism for opening clam shell casing 12, as illustrated in FIG. 5.

FIG. 6A is another front elevational view of the hand-held borescope of the present invention with FIG. 6B generally showing the interlocking parts of the locking mechanism 22, which should preferably include biasing means 24, such as springs, which will readily open the clam shell casing 12 when opening trigger 17A is actuated by the user. The locking/unlocking mechanism 22 is conventional in the art and may readily be substituted by alternative locking means for the clam shell casing 12 that achieves substantially the same end. FIG. 7 is a top plan view of the hand-held borescope 10 of the present invention, while FIG. 8 illustrates is a bottom plan view of the same.

While only several embodiments of the present invention have been shown and described, it will be obvious to those skilled in the art that many modifications may be made to the present invention without departing from the spirit and scope thereof.

What is claimed is:

1. A borescope having optical means concealable within a hand-held casing, comprising:
   a casing capable of being held in a single hand of a user between a thumb and fingers of the single hand of the user;
   means for opening said casing;
   a flexible probe having a first end mounted in said casing and a second end being a distal end capable of being moved from inside said casing to outside of said casing;
   optical means located at, or proximate to, the distal end of said flexible probe for viewing structures outside of said casing after said casing is opened, said flexible probe with said optical means being able to be completely concealed within said casing when not in use; and,
   a display located on a surface of said casing for viewing by the user that which is being seen via said optical means, said display being capable of being simultaneously held and viewed by the user while being held in the single hand of the user between the thumb and the fingers of the single hand of the user.

2. The borescope having optical means concealable within a hand-held casing according to claim 1, wherein said casing is a clam shell casing.

3. The borescope having optical means concealable within a hand-held casing according to claim 2, wherein said means for opening said casing includes biasing means for biasing said clam shell casing toward an open mode, said means for opening said casing being activated by a touch release located on one side of said casing.

4. The borescope having optical means concealable within a hand-held casing according to claim 3, wherein said clam shell casing includes a hand grips located along, at least a portion, of sides of said clam shell casing for allowing the casing to be held between the thumb and the fingers of the single hand of the user for ease of handling and of opening said clam shell casing.

5. The borescope having optical means concealable within a hand-held casing according to claim 1, wherein said optical means is a miniature camera having video capabilities.

6. The borescope having optical means concealable within a hand-held casing according to claim 1, wherein said means for opening said casing include means for releasing a latch located on a surface of said casing.

7. The borescope having optical means concealable within a hand-held casing according to claim 1, wherein said display for viewing by the user that which is being seen via said optical means is an LCD display.

* * * * *